Nov. 1, 1932.　　T. J. O'MEARA　　1,885,622
LIGHT SIGNAL
Filed June 30, 1930
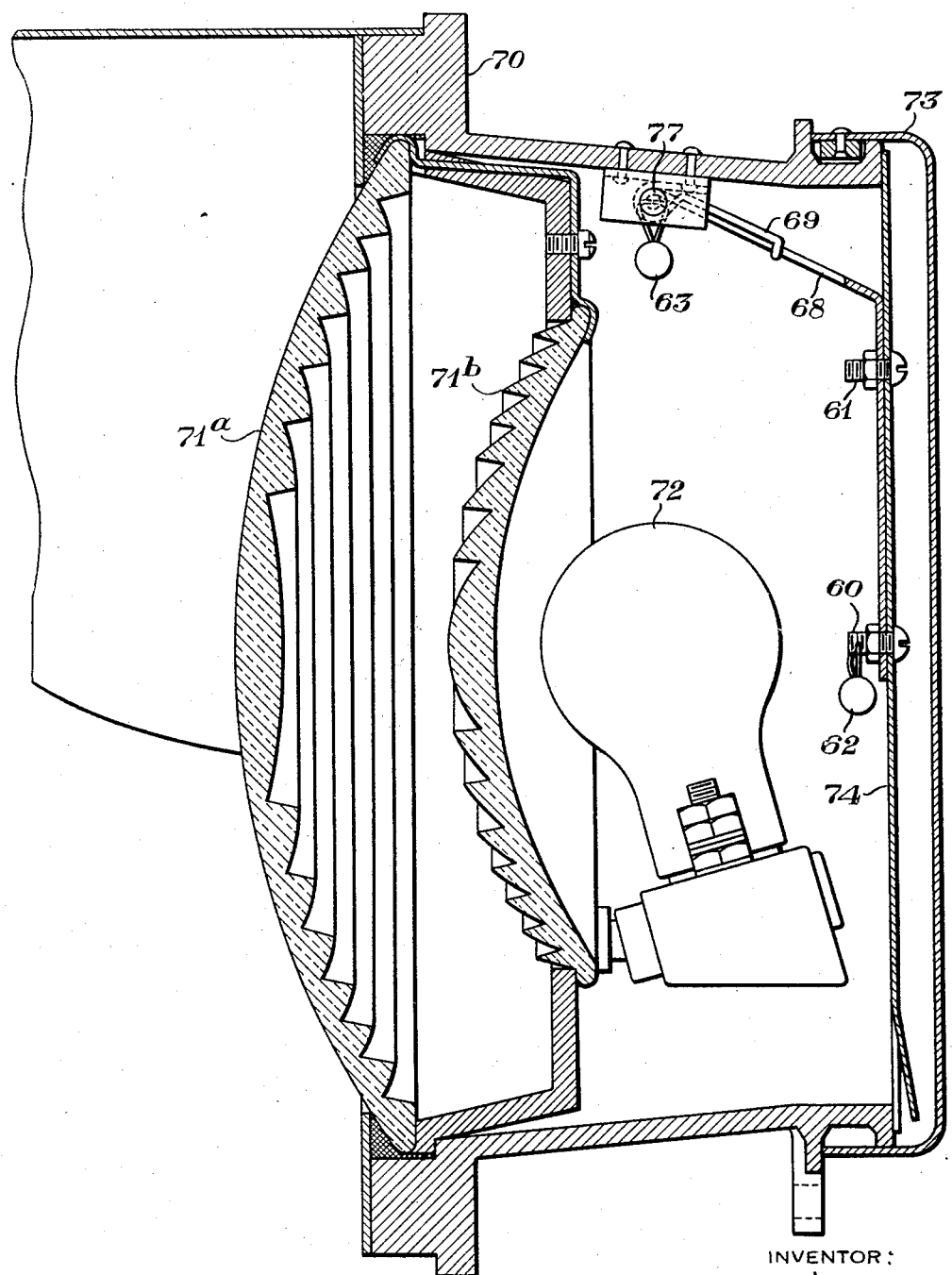
INVENTOR:
T. J. O'Meara,
BY A. R. Vinnill
His ATTORNEY Patented Nov. 1, 1932

1,885,622

UNITED STATES PATENT OFFICE

THOMAS J. O'MEARA, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA

LIGHT SIGNAL

Application filed June 30, 1930. Serial No. 464,879.

My invention relates to light signals, and particularly to signals of the type involving a lamp, a lens for projecting a beam of light from the lamp, and a cover at the rear of the enclosing casing for giving access to the lamp.

One feature of my invention is the provision, in a signal of this character, of novel and improved means for preventing a false indication due to light from an outside source when the cover is removed.

I will describe one form of signal embodying my invention, and will then point out the novel features thereof in claims.

The accompanying drawing is a vertical sectional view showing one form of signal embodying my invention.

Referring to the drawing, the signal comprises an enclosing casing 70, the front wall of which is provided with a pair of lenses 71$^a$ and 71$^b$. Mounted within the casing is an electric lamp 72 for projecting a beam of light through the lenses 71$^a$ and 71$^b$. The rear of the casing consists of the usual removable cover 73.

Located within the casing 70 and between the cover 73 and the rear edge of the casing is an opaque screen 74 which is biased in such position as to close the rear of the casing when the cover 73 is removed. As here shown, this screen is attached to a rigid member 68, one arm of which is pivotally mounted at 77 on the inside of the upper wall of the casing 70. The screen 74 is attached to the vertical arm of the member 68 by means of screws 60 and 61. The member 68 is biased by a spring 69 to such position that the screen 74 normally rests against the rear edge of the casing 70. When the cover 73 is removed, however, the screen 74 may be swung upwardly around the pivotal point 77 as a center until the upper arm of member 68 engages the top of casing 70, thereby giving access to the inside of the casing to enable a maintainer to replace the lamp 72. A seal 62 is provided for the bolt 60, so that the screen 74 cannot be removed from the member 68 without leaving a record of the fact that this has been done. A similar seal 63 is provided for the pivotal mounting of the arm 68 for the same reason.

When the cover 73 is removed from the casing, the screen 74 will prevent a false indication due to light which might otherwise enter the rear of the signal from an outside source. The screen 74 may, however, be swung outwardly and upwardly to a sufficient extent to give access to the lamp 72, without admitting enough light from the rear of the casing to give a false indication through the lenses 71$^a$ and 71$^b$. As soon as the screen 74 is released, it will return to its normal position in response to the biasing action of the spring 69.

Although I have herein shown and described only one form of signal embodying my invention, it is understood that various changes and modifications may be made therein within the scope of the appended claims without departing from the spirit and scope of my invention.

Having thus described my invention, what I claim is:

1. In a light signal comprising an enclosing casing, a lens in the front wall of the casing, a lamp in the casing for projecting a beam of light through said lens, and a removable cover in the rear of the casing; the combination with the foregoing instrumentalities of an opaque screen mounted in said casing between said cover and said lamp and biased to closed position and capable when the cover is removed of being manually opened to give access to the lamp, said screen having a part which cooperates with the casing to prevent the screen being opened far enough to admit an unsafe amount of light to the casing.

2. In a light signal comprising an enclosing casing, a lens in the front wall of the casing, a lamp in the casing for projecting a beam of light through said lens, and a removable cover in the rear of the casing; the combination with the foregoing instrumentalities of a rigid member having an upper arm pivotally mounted in the top of the casing and a lower substantially vertical arm, an opaque screen attached to said lower arm and located between said cover and the casing, said member and screen being biased to the closed position of the screen and capable when the cover is removed of being manually swung outwardly from the casing to give access to said lamp, the upper arm of said member cooperating with the top of the casing to prevent the screen being opened far enough to admit an unsafe amount of light to the casing.

In testimony whereof I affix my signature.

THOMAS J. O'MEARA.